Aug. 19, 1930.  J. A. LINK  1,773,190
COLLAPSIBLE TRUCK
Filed Jan. 2, 1930   3 Sheets-Sheet 1
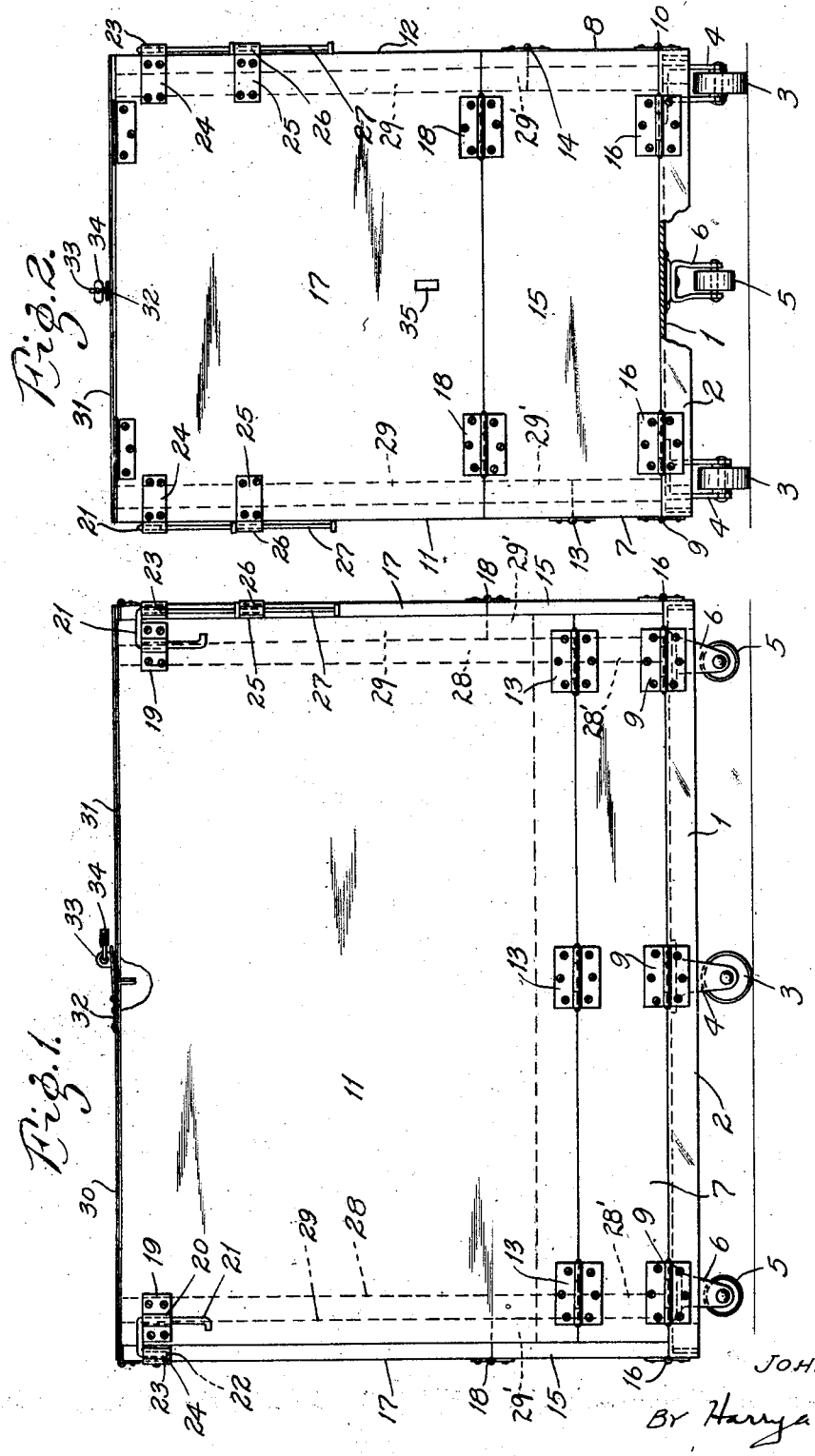
INVENTOR
JOHN A. LINK.
BY Harry A. Berner
ATTORNEY.

Aug. 19, 1930.　　　J. A. LINK　　　1,773,190
COLLAPSIBLE TRUCK
Filed Jan. 2, 1930　　　3 Sheets-Sheet 2
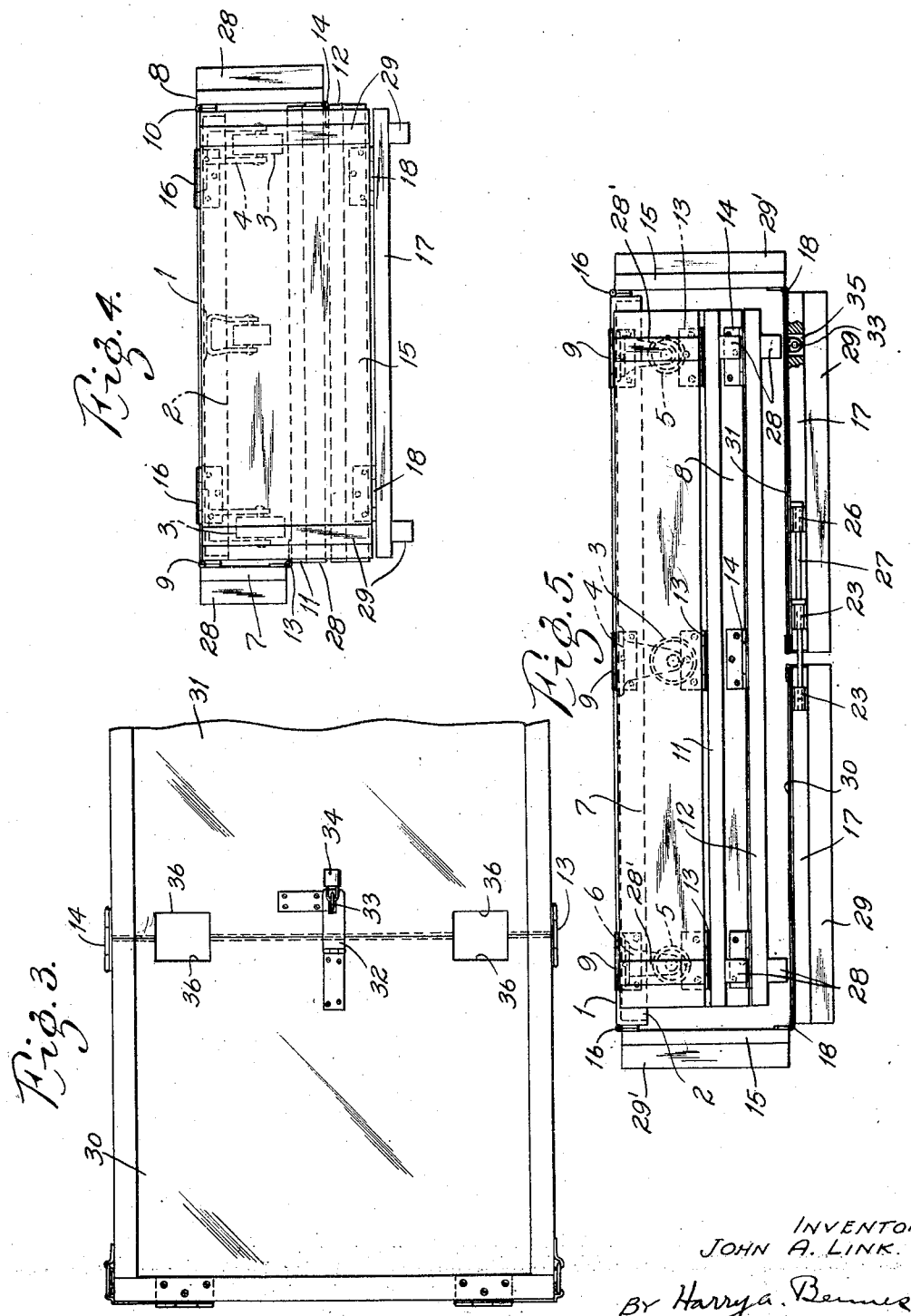
INVENTOR:
JOHN A. LINK.
By Harry A. Benner
ATTORNEY.

Aug. 19, 1930. J. A. LINK 1,773,190
COLLAPSIBLE TRUCK
Filed Jan. 2, 1930  3 Sheets-Sheet 3
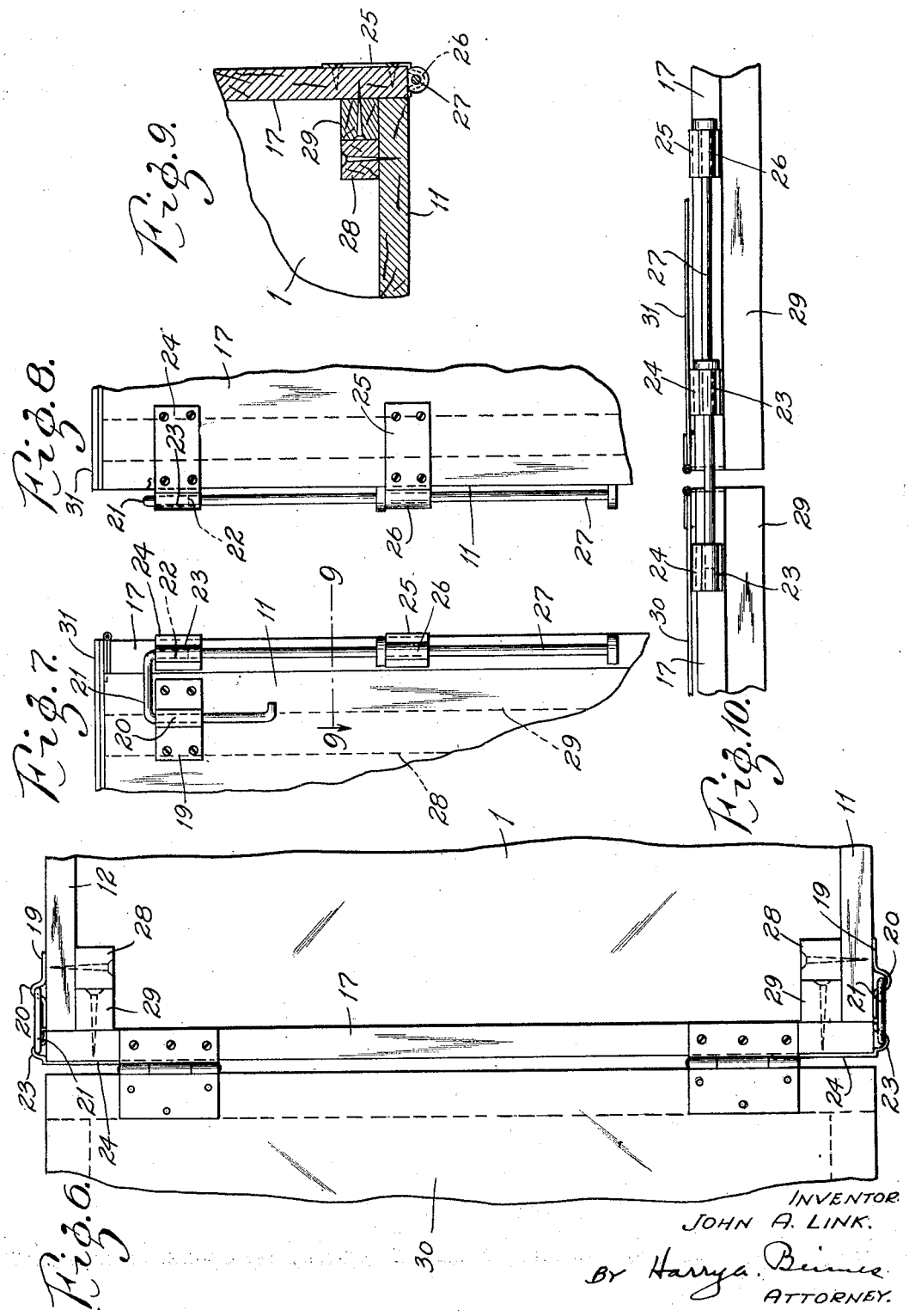
INVENTOR
JOHN A. LINK.
BY Harry A. Burns
ATTORNEY.

Patented Aug. 19, 1930

1,773,190

UNITED STATES PATENT OFFICE

JOHN A. LINK, OF ST. LOUIS, MISSOURI

COLLAPSIBLE TRUCK

Application filed January 2, 1930. Serial No. 417,980.

My invention has relation to improvements in collapsible trucks and it consists in the novel features of construction more fully set forth in the specification and pointed out in the claims.

Briefly, the invention comprises a truck, the sides and ends of which are foldable beneath the bottom for the purpose of reducing the truck to the smallest compact size when not in use. Obviously securing devices are provided to hold the sides and ends securely when in erected position, which devices are also utilized to hold the collapsed sides and ends securely together.

The object of the invention is apparent, namely the constructing of a truck for use in department stores and warehouses to transport bundles from place to place, the said truck being susceptible to contraction by collapsing the sides and ends so that it may be piled up with others not in use and not take up unnecessary space. This object, together with other advantages inherent in the invention, will be better apparent from a detailed description of the same in connection with the accompanying drawings, in which—

Fig. 1 is a side elevation of my improved truck with the sides and ends erected and secured so that the truck may be used for transporting articles; Fig. 2 is an end elevation of the erected truck, with part broken away; Fig. 3 is a top plan of my improved truck with part broken away; Fig. 4 is an end elevation of the truck in collapsed condition; Fig. 5 is a side elevation of the collapsed truck; Fig. 6 is an enlarged top plan of one end of the truck with the lid section in open position; Fig. 7 is an enlarged side elevation of one of the top corners of the truck showing the securing devices for holding the side and end together; Fig. 8 is an enlarged end elevation of that part of the truck shown in Fig. 7; Fig. 9 is a cross-sectional detail taken on the line 9—9 of Fig. 7; and Fig. 10 is an enlarged side elevation of the ends of the truck showing their opposed relation when collapsed and the locking bolt for securing them together.

Referring to the drawings, 1 represents the truck bottom, in the present instance having an angular flange 2 for the purpose of stiffening the same. A pair of rollers 3, 3 mounted in brackets 4, 4 are secured to the center of the bottom 1 in properly spaced relation and a single roller 5 of somewhat smaller size is mounted in a bracket 6 adjacent to each end of the bottom 1 to which the brackets are secured. It will be observed by referring to Fig. 2 that the sides of the truck are each formed in two sections, the lower section 7 of the left-hand side (in said Fig. 2) being somewhat narrower than the lower section 8 on the right side for a purpose that will appear hereinafter. The sections 7 and 8 are secured to the side flanges 2 of the bottom 1 by means of hinges 9, 10, respectively, and side sections 11 and 12 are secured to sections 7 and 8 by means of hinges 13, 14, respectively. Referring now to Fig. 1, it will be observed that the ends of the truck, which are also formed in sections, engage the edges of the side members when the ends are erected. The lower sections 15, 15 of the ends are hinged to the end flanges of the bottom 1 by means of hinges 16, 16 and the upper sections 17, 17 are secured to sections 15, 15 by means of hinges 18, 18. A strap 19 having a centrally disposed bearing 20 is secured adjacent to each end of the side members 11 and 12 near the top thereof and an L-shaped bolt 21 is mounted in the bearing 20 of the strap 19. The bolt 21 has a depending portion 22 adapted to enter the socket 23 of a keeper 24 secured to the ends 17, 17. A second keeper 25, having a socket 26, is also secured to the right end 17 so that the socket 26 will be in vertical alinement with the socket 23 of keeper 24. Bolts 27, 27 are mounted in the sockets 26, 26 of keepers 25, 25 and project slightly into the sockets 23, 23 of the keepers 24, 24 above the keepers 25, 25.

By referring to the enlarged fragmentary views shown in Figs. 7 and 8, it will be plainly seen that the bolts 21 operate to lock the sides and ends together when they are elected but the bolts 27 serve no function. The purpose of bolts 27 is to lock the parts together when the truck is collapsed as will be seen by referring to Figs. 5 and 10. When the truck is collapsed the side comprising sections 7 and 11 is first folded down and under the bottom, then the side comprising sections 8 and 12 is folded beneath section 11 after which the ends are dropped downwardly and the sections 17, 17 folded beneath the side section 12. When the ends 17, 17 are thus folded beneath the other parts they will be in opposed relation as shown in Figs. 5 and 10 and each bolt 27 may be slid through the sockets 26 and 23 of the sections 17 on which these sockets are mounted, until the end of the bolt 27 enters the socket 23 of the other end section 17 securely holding the sections 17, 17 in their collapsed position and confining the side sections between them and the truck bottom.

In order that the truck sides and ends may be properly braced I provide vertically disposed cleats 28 on the side sections 11 and 12 and 28' on sections 7 and 8, and vertically disposed cleats 29, 29' on the end sections 17 and 15, respectively. The cleats come into contacting relation when the sides and ends are erected and thus stiffen the corner, as clearly shown in Figs. 6 and 9.

If desired a cover may be provided for the truck as shown in the drawings, said cover preferably being formed in two half sections 30, 31 hinged respectively to the end sections 17, 17, the section 30 having a hasp 32 hinged adjacent to its free edge and the section 31 having a keeper 33 secured adjacent to its free edge to receive the hasp 32 and permit the sections to be locked together by means of a padlock 34 if desired. When the truck is collapsed the lid sections 30, 31 will lie flat against the ends 17, 17, one of which is provided with a slot 35 to receive the keeper 33 (as shown in Fig. 5). The articulating edges of lid sections 30, 31 are each provided with notches 36, 36 (Fig. 3) so that these edges will not foul the hinges 18, 18 when the sides and ends are folded together (Fig. 5).

Obviously, the securing devices for holding sides and ends together may be modified although those here shown are preferred because of simplicity.

Having described my invention I claim:

1. A truck comprising a bottom having wheels thereon, side members each comprising two sections, one of which is hinged to the bottom and the other section hinged to the first, said side members being adapted to fold beneath said bottom, end members, each comprising two sections hinged respectively to the bottom and to each other and adapted to fold beneath the side members, and means for locking the ends and sides together when erected, said means also serving to lock the side and end members together in folded position.

2. A truck comprising a bottom having wheels mounted thereon, side members and end members hinged to the margins of the bottom and foldable beneath said bottom, locking bolts on the side members and keepers on the end members adapted for engagement to lock the sides and ends together when erected, and locking bolts on the end members adapted for engagement with the keepers to lock the side and end members in folded position.

3. A truck comprising a bottom having wheels thereon, side members and end members hinged to the margins of the bottom and foldable therebeneath, a lid section hinged to each end member and foldable flat against said member, means for locking the lid sections together when the side and end members are erected, means for locking the members together when erected, and locking bolts on the end members for securing the members in folded position.

4. A truck comprising a bottom having wheels thereon, side and end members hinged to the margins of the bottom and foldable therebeneath, reinforcing cleats contiguous to the side edges of each of said members, the cleats on each side member extending alongside the adjacent cleats of the end member when the members are erected, means for locking the members in erected position and means for locking said members in folded position.

In testimony whereof I hereunto affix my signature.

JOHN A. LINK.